United States Patent
Jugovic et al.

(10) Patent No.: US 7,537,361 B2
(45) Date of Patent: May 26, 2009

(54) AIRCRAFT WINDOW CASE THAT CAN BE ARTIFICIALLY ILLUMINATED IN AN INDIRECT MANNER

(75) Inventors: Natalie Jugovic, Neu-Ulm (DE); Andreas Kämmerer, Ulm (DE); Oliver Lang, Ulm (DE); Silvan Fiedler, Ulm (DE); Axel Kraus, Speyer (DE); Robert Gotschy, Dietenheim (DE)

(73) Assignee: Airbus Deutschland GmbH, Hamburg (DE)

( * ) Notice: Subject to any disclaimer, the term of this patent is extended or adjusted under 35 U.S.C. 154(b) by 696 days.

(21) Appl. No.: 10/510,776

(22) PCT Filed: Apr. 9, 2003

(86) PCT No.: PCT/EP03/03689

§ 371 (c)(1),
(2), (4) Date: Aug. 3, 2005

(87) PCT Pub. No.: WO03/084810

PCT Pub. Date: Oct. 16, 2003

(65) Prior Publication Data

US 2006/0032980 A1 Feb. 16, 2006

(30) Foreign Application Priority Data

Apr. 9, 2002 (DE) .............................. 102 15 559

(51) Int. Cl.
*B64C 1/14* (2006.01)
*B64D 47/04* (2006.01)
*F21V 1/20* (2006.01)

(52) U.S. Cl. .................. 362/471; 362/470; 362/503; 244/129.3; 296/146.1

(58) Field of Classification Search ............. 244/129.3, 244/129.1, 129.2, 129.4, 129.5; 362/800, 362/470, 471, 488, 503, 252, 227; 296/146.1, 296/146.15
See application file for complete search history.

(56) References Cited

U.S. PATENT DOCUMENTS 4,364,533 A * 12/1982 Pompei et al. ............ 244/129.3
4,541,595 A * 9/1985 Fiala et al. ................ 244/129.3
4,597,033 A  6/1986 Meggs et al.

(Continued)

FOREIGN PATENT DOCUMENTS

DE  3313463 A1  10/1984

(Continued)

OTHER PUBLICATIONS

International Search Report for Applicant's PCT Application No. PCT/EP03/03689, Feb. 23, 2002.

Primary Examiner—Jacob Y Choi
(74) Attorney, Agent, or Firm—Wood, Herron & Evans, LLP

(57) ABSTRACT

The invention relates to an aircraft window case (10) that can be artificially illuminated in an indirect manner, comprising a connecting cone (20) for connection of the aircraft window case (10) to the inner face of an aircraft window (22), a panel (12) closing off the window case (10) from the aircraft interior, a hollow-cylindrical transition element (18) made of translucent material for spanning a distance between the connecting cone (20) and the panel (12), and an illumination device (24) which radiates light on to the outer face of the transition element (18).

12 Claims, 1 Drawing Sheet

U.S. PATENT DOCUMENTS

| | | | |
|---|---|---|---|
| 5,211,466 A * | 5/1993 | Jarocki et al. | 362/540 |
| 5,400,225 A * | 3/1995 | Currie | 362/554 |
| 5,628,557 A * | 5/1997 | Huang | 362/252 |
| 6,092,915 A * | 7/2000 | Rensch | 362/471 |
| 6,227,491 B1 * | 5/2001 | Stephan et al. | 244/129.3 |
| 6,601,799 B2 * | 8/2003 | Lau et al. | 244/129.3 |
| 2002/0145081 A1 | 10/2002 | Lau et al. | |

FOREIGN PATENT DOCUMENTS

| | | |
|---|---|---|
| DE | 19529737 C1 | 12/1996 |
| DE | 20018808 U1 | 3/2001 |
| EP | 1249391 A2 | 10/2002 |
| WO | 19502293 A1 | 8/1996 |

* cited by examiner

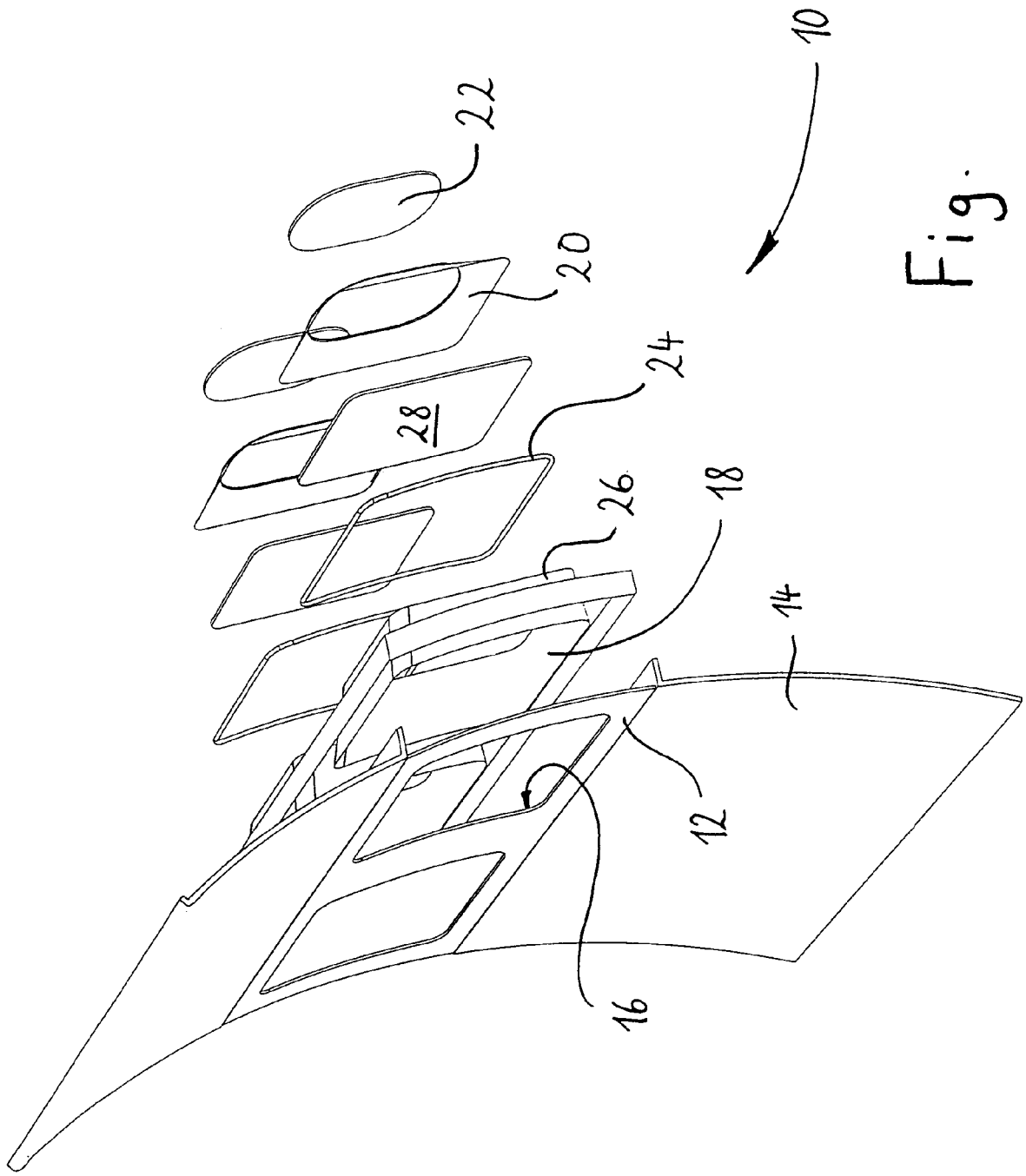

AIRCRAFT WINDOW CASE THAT CAN BE ARTIFICIALLY ILLUMINATED IN AN INDIRECT MANNER

The invention relates to an aircraft window case that can be artificially illuminated in an indirect manner.

In commercial aircraft, efforts are now being made to offer passengers, in particular business-class and first-class passengers, more and more comfort. This includes fitting out the interior of the aircraft in an individual manner which not only takes account of all kinds of practical considerations but is intended to ensure that a passenger experiences well-being.

It is the object of the invention to increase the degree of well-being of a passenger on board a commercial aircraft, in particular at nighttime.

For this purpose the invention proposes an aircraft window case that can be artificially illuminated in an indirect manner, comprising a connecting cone for connection to the inner face of an aircraft window, a panel which closes the window case off from the interior of the aircraft, a hollow-cylindrical transition element made of a translucent material for spanning a distance between the connecting cone and the panel, and an illuminating device which radiates light on to the outer face of the transition element. In this way there is provided a device which provides an aircraft passenger with light from the window even when darkness prevails outside. Because of the hollow-cylindrical transition element of translucent material which is back-lit by means of the illumination device, the light-emitting area is relatively large and the light is dazzle-free. In addition, the back-lit hollow-cylindrical transition element creates an impression of spatial depth which contributes to a subjectively enhanced feeling of space, in particular for the aircraft passenger sitting next to the window. It is self-evident that the back-lighting can be switched on and off as desired by the aircraft passenger.

The intensity of the back-lighting is preferably controllable by the passenger, so that he can set, for example, an illumination brightness sufficient for reading and, on the other hand, at rest times can select an illumination which is not disturbing but merely somewhat brightens the environment.

Every translucent material is in principle suitable for the hollow-cylindrical transition element. In addition, the translucent material may also be transparent. Preferably, however, a material is used which scatters the light emitted by the illumination device diffusely and does not give the passenger a view of the parts arranged behind the hollow-cylindrical transition element, for example, the illumination device itself.

According to a preferred embodiment, the illumination device may emit light of different colours, and the light colour emitted by the illumination device is preferably selectable by the user. For example, it may be provided that the user can set the light colour to resemble daylight if he wishes to read in darkness, and that the light colour becomes increasingly warm with decreasing intensity, which is experienced as agreeable by many people as background lighting. Alternatively or additionally, it may also be provided that the user can select the light colour in keeping with his current personal mood, independently of the intensity of the illumination itself; for example, with a more reddish, more bluish, more greenish or more yellowish hue.

According to a further development of the present invention, not only the hollow-cylindrical transition element but the panel closing off the window case from the aircraft interior is made of translucent material. In this way a still stronger impression is given that light is coming in through the window as during daytime. The quality of illumination for reading purposes is also improved, since areas of the window case facing directly towards the passenger now also radiate light.

In a preferred embodiment of the aircraft window case according to the invention, satinised plastics acrylic glass is used as the translucent material for the hollow-cylindrical transition element and/or the panel. This has the above-mentioned, desired properties and can be manufactured without difficulty in any desired shape.

In an embodiment of the aircraft window case according to the invention the hollow-cylindrical transition element and the connecting cone for connection to the window itself are connected together in one piece. If desired, the connecting cone may also be made of translucent material and back-lit, independently of whether it is connected together in one piece with the hollow-cylindrical transition element or not.

In embodiments of the aircraft window case according to the invention in which the connecting cone and the hollow-cylindrical transition element are not connected together in one piece, a physical or mechanical window blackout device may be arranged between the connecting cone and the hollow-cylindrical transition element, for example, a window blind.

The window blackout device is preferably a so-called SPD (suspended particle device). It includes an active layer of needle-shaped dipoles which are embedded "floatingly" in an organic liquid or an organic gel. This layer is laminated in a planar manner with two electrodes or filled between two electrodes and can be manufactured in the form of a film. Such a device covers the free window opening and its transparency can be regulated by activation with electric current in such a way that every intermediate state between a maximum transparency and complete light-blockage can be set. An aircraft passenger sitting next to the window can therefore attenuate strongly dazzling sunlight entering through the window to the desired degree. In addition, the aircraft window case according to the invention even permits artificial light to be mixed with the daylight entering through the window by is means of its indirect artificial illumination facility, in order to set a desired illumination independently of the incident, possibly dazzling daylight. This is especially advantageous if the artificial back-lighting of the aircraft window case according to the invention has a character resembling daylight.

The illumination device of the aircraft window case according to the invention preferably surrounds the transition element in an annular manner. The attainment of uniform back-lighting at all points of the transition element is thereby facilitated.

An illumination device which surrounds the hollow-cylindrical transition element in an annular manner can be realised in different ways. For example, a plurality of light sources may be arranged spaced apart around the transition element. Alternatively, the light source may be an annular neon tube. According to yet another embodiment, the light from a single light source may be conducted to different points around the transition element by means of fibre-optical technology.

To change the colour of the light emitted by the illumination device, either a plurality of light sources may be provided, the emitted light of which is mixed to the desired hue, or a light source is used, the colour of which can be changed through activation.

All known light sources are suitable as light source(s) for the illumination device of the aircraft window case according to the invention, for example, filament bulbs, halogen lamps, neon tubes and LEDs.

For a better understanding of the invention, a preferred embodiment of an aircraft window case according to the invention is explained in more detail below with reference to the single appended schematic FIGURE, which shows a three-dimensional view of the aircraft window case in an exploded representation.

The single FIGURE shows an exploded view of an aircraft window case denoted generally by 10 which, viewed from the aircraft interior, begins with a panel 12 closing off the window case 10 from the aircraft interior, which panel 12 is integrated here in a side cladding 14 of an interior trim (not shown in detail) of the aircraft. In the present case, the panel 12 has an approximately square window opening 16.

Adjoining the panel 12 is a hollow-cylindrical transition element 18 which spans the gap between the panel 12 and a connecting cone 20 which provides a visually attractive transition to the actual, substantially oval window pane 22.

In the embodiment illustrated, the hollow-cylindrical transition element 18, like the panel 12, is made of translucent, satinised acrylic glass. In this case the transition element 18 has an approximately square cross-section with an inner opening which continues the window opening 16 of the panel 12.

An annular illumination device 24 surrounds the transition element 18 on the outside and selectively radiates light on to the outer face 26 of the transition element 18.

The entire inner face of the transition element 18 and, in the embodiment illustrated, also the outer face of the panel 12 facing towards the aircraft passenger, are thereby uniformly illuminated. The illumination device 24 may be, for example, a neon tube formed to the desired shape; alternatively, however, a plurality of more or less punctual light sources distributed around the perimeter of the transition element 18 may be used.

In the embodiment shown, a panel-shaped, so-called SPD (suspended particle device) 28 is arranged between the transition element 18 and the connecting cone 20. The intensity of the light entering through the window pane 22 can thereby be influenced by setting the degree of light transmission of the SPD to the desired level.

The operation of an SPD was explained in principle in the introductory section of the description, so that it need not be discussed again here. Alternatively, instead of the SPD 28, other physical or mechanical blackout devices, for example a window blind, may be used.

Although the window opening 16 and the adjoining inner opening of the transition element 18 are approximately square in the embodiment shown, it is self-evident that any other desired shape may be selected, for example, round, oval, polygonal, etc., without thereby impairing the operation of the aircraft window case 10.

In the FIGURE illustrating the embodiment used as an example, two aircraft window cases 10 are shown side-by-side. It is self-evident that a plurality of aircraft window cases 10 may also be arranged side-by-side, in which case the panel 12 may be so configured that it has a plurality of window openings 16, or that only a single aircraft window case 10 may be present.

The invention claimed is:

1. Aircraft window case (10) that can be artificially illuminated in an indirect manner, comprising
    a connecting cone (20) for connection to the inner face of an aircraft window (22),
    a panel (12) closing off the window case from the aircraft interior,
    a hollow-cylindrical transition element (18) made of translucent material for spanning a distance between the connecting cone (20) and the panel (12), and
    an illumination device (24) which radiates light onto an outer face of the transition element (18).

2. Aircraft window case according to claim 1, characterised in that the illumination device (24) surrounds the transition element (18) in an annular manner.

3. Aircraft window case according to claim 1, characterised in that the illumination device (24) comprises a plurality of light sources.

4. Aircraft window case according to claim 1, characterised in that the illumination device (24) is adapted to emit light of different colours.

5. Aircraft window case according to claim 4, characterised in that the light colour emitted by the illumination device (24) is selectable by the user.

6. Aircraft window case according to claim 1, characterised in that the light sources(s) of the illumination device (24) are LEDs.

7. Aircraft window case according to claim 1, characterised in that the illumination device (24) includes a neon tube, which is preferably annular.

8. Aircraft window case according to claim 1, characterised in that the panel (12) is also made of translucent material.

9. Aircraft window case according to claim 1, characterised in that the hollow-cylindrical transition element (18) and the connecting cone (20) are connected together in one piece.

10. Aircraft window case according to claim 1, characterised in that a mechanical or physical window blackout device is arranged between the connecting cone (20) and the hollow-cylindrical transition element (18).

11. Aircraft window case according to claim 1, characterized in that the window blackout device is an SPD (28).

12. Aircraft window case according to claim 1, characterized in that the translucent material of the hollow-cylindrical transition element (18) and/or of the panel (12) is satinised acrylic glass. low-cylindrical transition element (18) and/or of the panel (12) is satinised acrylic glass.

* * * * *